(12) United States Patent
Hsieh et al.

(10) Patent No.: US 11,463,227 B2
(45) Date of Patent: Oct. 4, 2022

(54) ACTIVATED SECONDARY CELLS TRANSITION BETWEEN DORMANCY BEHAVIOR AND ACTIVE BEHAVIOR IN 5G NR SYSTEM

(71) Applicant: MEDIATEK INC., Hsinchu (TW)

(72) Inventors: Chi-Hsuan Hsieh, Hsinchu (TW); Wei-De Wu, Hsinchu (TW); Pei-Kai Liao, Hsinchu (TW)

(73) Assignee: MEDIATEK INC., Hsinchu (TW)

(*) Notice: Subject to any disclaimer, the term of this patent is extended or adjusted under 35 U.S.C. 154(b) by 0 days.

(21) Appl. No.: 16/942,187

(22) Filed: Jul. 29, 2020

(65) Prior Publication Data
US 2021/0050987 A1 Feb. 18, 2021

Related U.S. Application Data

(60) Provisional application No. 62/924,311, filed on Oct. 22, 2019, provisional application No. 62/910,602, (Continued)

(51) Int. Cl.
*H04L 5/00* (2006.01)
*H04W 72/12* (2009.01)
*H04W 72/04* (2009.01)

(52) U.S. Cl.
CPC .......... *H04L 5/0098* (2013.01); *H04L 5/001* (2013.01); *H04W 72/042* (2013.01);
(Continued)

(58) Field of Classification Search
CPC .... H04L 5/001; H04L 5/0098; H04W 72/042; H04W 72/0453; H04W 72/1289
See application file for complete search history.

(56) References Cited

U.S. PATENT DOCUMENTS

2016/0157219 A1* 6/2016 Uemura ............ H04W 72/0406
370/329
2017/0202012 A1 7/2017 Park et al.
(Continued)

FOREIGN PATENT DOCUMENTS

WO WO 2019/070579 A1 4/2019
WO WO 2019/126361 A1 6/2019

OTHER PUBLICATIONS

Combined Taiwanese Office Action and Search Report dated Feb. 20, 2021 in Taiwanese Patent Application No. 109126329 (with English translation of categories of cited documents), 9 pages.
(Continued)

*Primary Examiner* — Kevin C. Harper
(74) *Attorney, Agent, or Firm* — Oblon, McClelland, Maier & Neustadt, L.L.P.

(57) ABSTRACT

Aspects of the disclosure provide a method and an apparatus for transitioning one or a plurality of activated secondary cells (SCells) between a dormancy behavior and an active behavior. For example, the apparatus can include receiving circuitry and processing circuitry. The receiving circuitry can be configured to receive a configuration indicating a number of SCell groups each including at least one of the SCells, and an indication of at least one of the SCell groups to be transitioned between the dormancy behavior and the active behavior. The processing circuitry can be configured to transition the at least one SCell of the at least one SCell group between the dormancy behavior and the active behavior.

14 Claims, 5 Drawing Sheets

Related U.S. Application Data filed on Oct. 4, 2019, provisional application No. 62/888,126, filed on Aug. 16, 2019.

(52) U.S. Cl.
CPC ... *H04W 72/0453* (2013.01); *H04W 72/1289* (2013.01); *H04L 5/0094* (2013.01)

(56) References Cited

U.S. PATENT DOCUMENTS

| | | |
|---|---|---|
| 2018/0041325 A1 | 2/2018 | Lee et al. |
| 2019/0021052 A1 | 1/2019 | Kadiri et al. |
| 2019/0124558 A1* | 4/2019 | Ang .................... H04W 72/042 |
| 2020/0313833 A1* | 10/2020 | Yi ..................... H04W 52/0212 |

OTHER PUBLICATIONS

Taiwanese Office Action dated Apr. 23, 2021 in Taiwanese Patent Application No. 109126329, 6 pages.

* cited by examiner

ACTIVATED SECONDARY CELLS TRANSITION BETWEEN DORMANCY BEHAVIOR AND ACTIVE BEHAVIOR IN 5G NR SYSTEM

INCORPORATION BY REFERENCE

This present disclosure claims the benefit of U.S. Provisional Application No. 62/888,126, "Implicit and combined group-based implicit indication for switch from dormancy behavior to active behavior on SCell(s)" filed on Aug. 16, 2019, U.S. Provisional Application No. 62/910,602, "Transition methods for SCell(s) dormancy behavior to active behavior in 5G NR systems" filed on Oct. 4, 2019, and U.S. Provisional Application No. 62/924,311, "Transition Methods for SCell(s) Dormancy Behavior in 5G NR systems" filed on Oct. 22, 2019, which are incorporated herein by reference in their entirety.

TECHNICAL FIELD

The present disclosure relates to wireless communications and, more particularly, to a method and an apparatus for transitioning one or a plurality of activated secondary cells (SCells) between a dormancy behavior and an active behavior.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

With rapid development in wireless communication technologies, mobile communication systems have evolved across generations, e.g., Long-Term Evolution (LTE), LTE-Advanced (LTE-A) and New Radio (NR). To meet the explosive growth in traffic demand, a variety of techniques have been introduced to LTE, LTE-A and NR systems, including carrier aggregation (CA). In CA, two or more carriers (referred to as component carriers (CCs)) can be aggregated to provide a wide bandwidth. These CCs can include one primary CC (PCC) and one or more secondary CCs (SCCs), and can be organized into multiple cells, including one primary cell (PCell) associated with the PCC and one or more secondary cells (SCells) associated with the SCCs. The PCell is always activated, while the SCells can be activated or deactivated. The activation and the deactivation are done via media access control (MAC) control element (CE).

SUMMARY

Aspects of the disclosure provide a method for transitioning one or a plurality of activated secondary cells (SCells) between a dormancy behavior and an active behavior. The method can include receiving, at a user equipment (UE), from a base station (BS) a configuration indicating a number of SCell groups each including at least one of the SCells. The method can further include receiving an indication of at least one of the SCell groups to be transitioned between the dormancy behavior and the active behavior. The method can also include transitioning the at least one SCell of the at least one SCell group between the dormancy behavior and the active behavior.

In some embodiments, the indication can be signaled by downlink control information (DCI). For example, the DCI can include a DCI format and a bitmap that can be appended to the DCI format and have the number of bits each corresponding to one of the SCell groups to be transitioned between the dormancy behavior and the active behavior. The DCI format can be DCI format 0-1 or DCI format 1-1. In other embodiments, the configuration can be included in a radio resource control (RRC) message. In various embodiments, the method can still include transmitting a characteristic of the SCells to the BS. For example, one of the SCell groups can include at least two SCells, and the characteristic can indicate that the at least two SCells use a common radio frequency (RF) front end. For example, the SCells can be indexed according to sizes of their respective SCell identities (SCell IDs), and the configuration can further indicate an index of the at least one SCell included in each of the SCell groups. In some embodiments, one of the SCell groups can include at least two SCells that share a common frequency band. In other embodiments, the number can be between 1 and 5.

Aspects of the disclosure provide an apparatus for transitioning one or a plurality of activated SCells between a dormancy behavior and an active behavior. For example, the apparatus can include receiving circuitry and processing circuitry. The receiving circuitry can be configured to receive a configuration indicating a number of SCell groups each including at least one of the SCells, and an indication of at least one of the SCell groups to be transitioned between the dormancy behavior and the active behavior. The processing circuitry can be configured to transition the at least one SCell of the at least one of the SCell groups between the dormancy behavior and the active behavior. In some embodiments, the apparatus can further include transmitting circuitry configured to transmit a characteristic of the SCells. For example, one of the SCell groups can include at least two SCells, and the characteristic can indicate that the at least two SCells use a common RF front end. For example, the SCells can be indexed according to sizes of their respective SCell IDs, and the configuration can further indicate an index of the at least one SCell included in each of the SCell groups.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

In LTE and NR, carrier aggregation (CA) is employed to assign two or more component carriers (CCs) to a UE having a CA capability, thereby increasing the bandwidth and data rate of the UE. CCs can be organized into multiple cells, including one primary cell (PCell) and one or more secondary cells (SCells). The PCell is always activated, while the SCells can be activated or deactivated. After configured, an SCell is deactivated initially. When there is a huge amount of data to be delivered to the UE, a BS can activate the SCell to maximize downlink throughput. The BS can also deactivate the activated SCell when there is no more data to be delivered to the UE, to reduce the power consumption of the UE. The activation and the deactivation are done via media access control (MAC) control element (CE). Compared to LTE, NR has longer activation time due to SSB-based cell search, synchronization and beam management.

Two behaviors are introduced into the activation state, i.e., a dormancy behavior and an active behavior. An activated SCell can transition between these two behaviors. The UE can perform channel state information (CSI) measurements, automatic gain control (AGC) and beam management, and monitor physical downlink control channel (PDCCH) for an activated SCell with the active behavior. The UE does not monitor PDCCH for the activated SCell transitioned from the active behavior to the dormancy behavior, to reduce power consumption. The UE can still perform CSI measurements, AGC and beam management for the dormant SCell, and thus the SCell can be transitioned from the dormancy behavior to the active behavior quickly.

To reduce the signaling overhead of transitioning one or a plurality of SCells between the dormancy behavior and the active behavior, a method is proposed to transition these SCells on a group basis. The BS can divide the SCells into a number of SCell groups each including at least one of the SCell, and send the configuration to the UE. The BS can then send to the UE an indication of how the SCell groups are transitioned.

Figure 1:
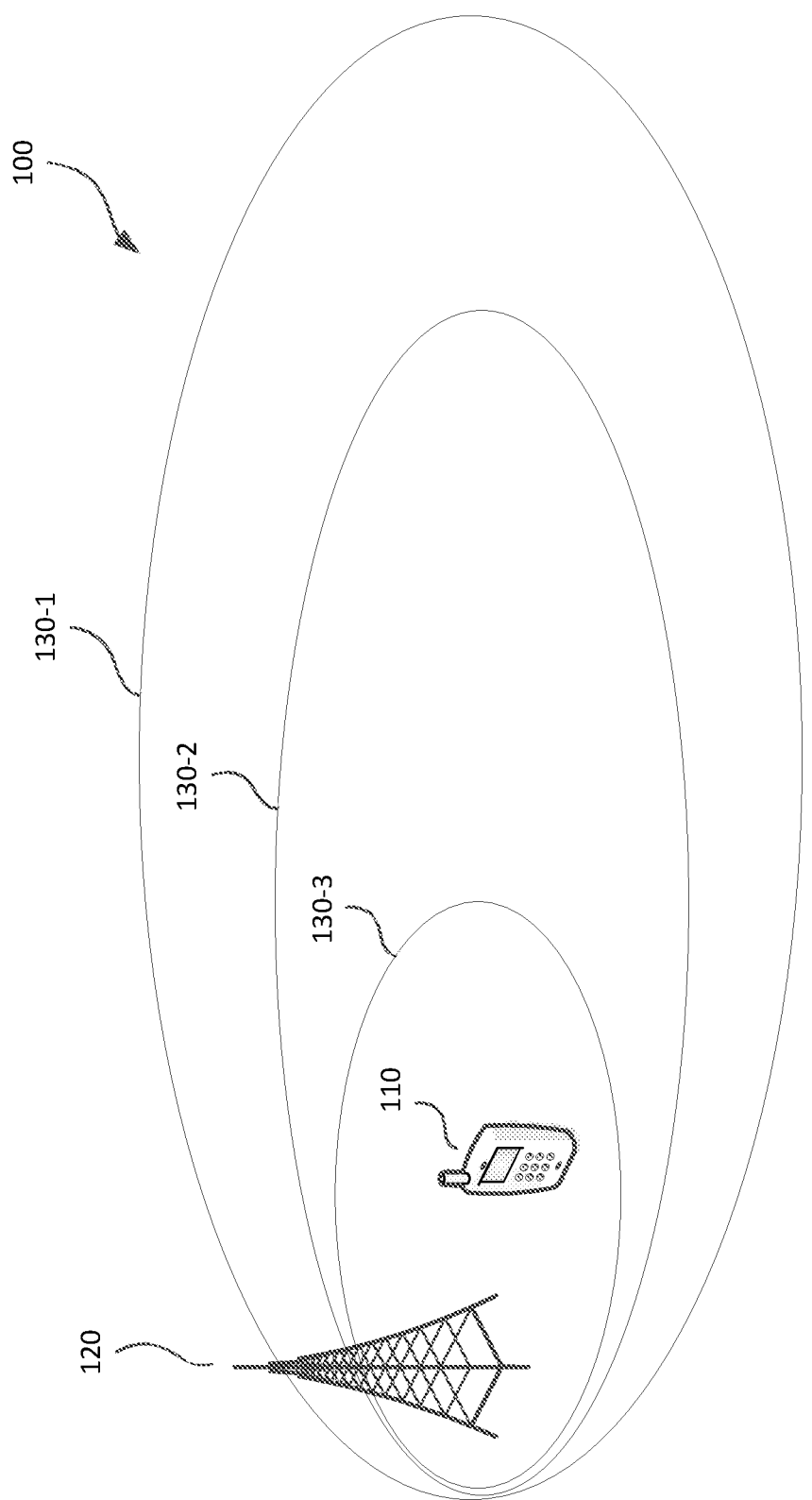
FIG. 1 shows an exemplary wireless communication system according to some embodiments of the disclosure.

FIG. 1 shows an exemplary wireless communication system 100 according to some embodiments of the disclosure. The wireless communication system 100 can include a base station (BS) 120 and a user equipment (UE) 110. The BS 120 can be an eNB or a gNB. The UE 110 can be a vehicle, a computer, a mobile phone, and the like. The UE 110 can communicate with the BS 120. Aspects described herein can be used in the context of any spectrum management scheme, including, for example, dedicated licensed spectrum, unlicensed spectrum, and (licensed) shared spectrum (such as Licensed Shared Access (LSA) and Spectrum Access System (SAS)). In some embodiments, the UE 110 can be configured to communicate with the BS 120 using orthogonal frequency-division multiplexing (OFDM) communication signals over a multicarrier communication channel according to various communication techniques, such as an orthogonal frequency-division multiple access (OFDMA) communication technique (e.g., for downlink communications) or a single carrier frequency division multiple access (SC-FDMA) communication technique (e.g., for uplink and ProSe for sidelink communications). The OFDM signals can include a plurality of orthogonal subcarriers.

In some embodiments, the wireless communication system 100 can employ carrier aggregation (CA) to assign two or more carriers to the UE 110 having a CA capability according to service conditions, thereby increasing the bandwidth and data rate of the UE 110. The UE 110 can report to the BS 120 via UE Capability Information message of which combination of frequency bands it can support in terms of CA. Each aggregated carrier is referred to as a component carrier (CC). In CA, two or more CCs, which can have different bandwidths, can be aggregated, and the UE 110 can simultaneously receive or transmit on one or more CCs, depending on its capability. The number of CCs aggregated between downlink and uplink may be different. A scenario where the number of downlink CCs (DL CCs) is the same as the number of uplink CCs (UL CCs) is called a symmetric aggregation. Another scenario where the number of DL CCs and the number of UL CCs are different is called an asymmetric aggregation. CA can be implemented by aggregating contiguous CCs within the same frequency band, so called intra-band contiguous aggregation, by aggregating non-contiguous CCs within the same frequency band, so called intra-band non-contiguous aggregation, or by aggregating non-contiguous CCs within different frequency bands, so-called inter-band aggregation. Each CC (a scheduling CC) can be individually scheduled with a scheduling assignment/grant on either the same (associated) CC (a scheduled CC) as the data (self-scheduling) or on a different CC than the data (cross-carrier scheduling). That is, a scheduling CC can be the same as or different from a scheduled CC.

When CA is used, there are a number of serving cells, one for each CC. CCs can be organized into multiple serving cells, including one primary serving cell (PCell) and one or more secondary serving cells (SCells), which can provide different coverages (i.e., different cell sizes) due to that the CCs on different frequency bands will experience different pathloss, for example. The cell that the UE 110 selects during initial establishment (e.g., RRC Connection Request/ RRC Connection Re-establishment Request) will become the PCell. After RRC connection is established, the BS 120 can add/configure the SCell(s) using RRC Connection Reconfiguration message to provide additional radio resources. The PCell and the SCells can be configured through a radio resource control (RRC) parameter. In the example shown in FIG. 1, the wireless communication system 100 can include a PCell 130-1 and two SCells 130-2 and 130-3. The RRC is only handled by one cell, that is, the PCell 130-1, served by a primary CC (PCC). For example, the UE 110 can receive on downlink PCC non-access stratum (NAS) information such as security parameters. The other CCs are all referred to as secondary CCs (SCCs), serving the SCells 130-2 and 130-3.

The PCC (and the PCell 130-1) can be changed only at handover, while the SCCs (and the SCells 130-2 and 130-3) can be added/configured, released/removed and reconfigured/modified as required. For example, the SCell 130-2 may be added either blindly or after the BS 120 receives a measurement report with a certain event from the UE 110 indicating that the reference signal received power (RSRP) of the SCell 130-2 is above a threshold. For example, at the time of SCell addition, the BS 120 can send SCellIndex, cellIdentification, radioResourceConfigCommonSCell, radioResourceConfigDedicatedSCell etc. to the UE 110 via RRC Connection Reconfiguration message. The SCell 130-2, when configured through an RRC Connection Reconfiguration procedure, remains in a deactivated state and waits to be activated. When the SCell 130-2 is modified, the UE 110 does not change the activation status. The BS 120 can use IE sCellToReleaseList in RRC Connection Reconfiguration message to release the SCell 130-2. During handover, if the SCell 130-2 is still in use in the target PCell (that is, the SCell 130-2 is not released during handover), the SCell 130-2 in the target Cell is initially in the deactivated state.

Figure 2:
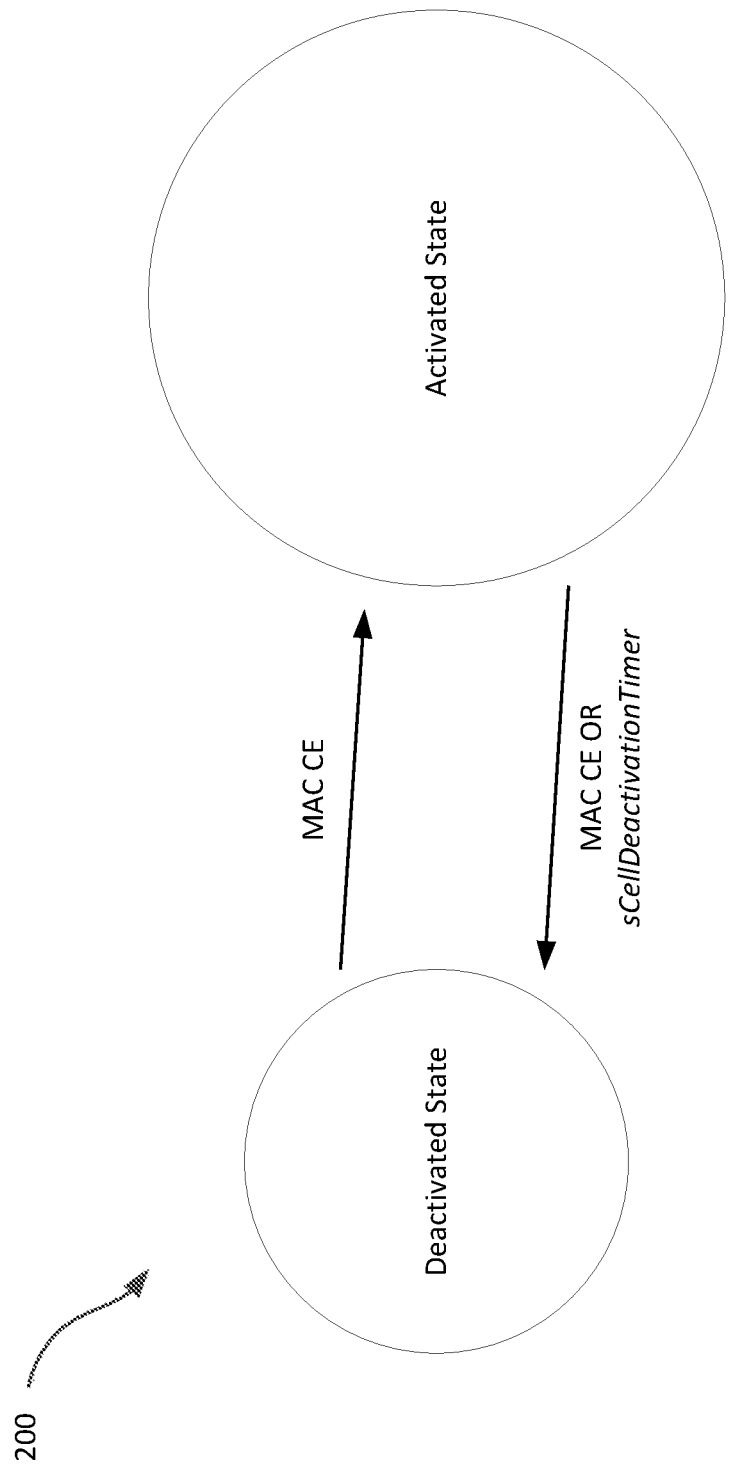
FIG. 2 shows an exemplary transitioning of an SCell between an activated state and an deactivated state according to some embodiments of the disclosure.

FIG. 2 shows an exemplary transitioning of an SCell between an activated state and an deactivated according to some embodiments of the disclosure. The PCell 130-1 is always activated. In order for the UE 110 to receive data on at least one of the SCells 130-2 and 130-3, the SCell 130-2 for example, the SCell 130-2 has to be activated. For example, when there is a huge amount of data to be delivered to the UE 110, the BS 120 can activate the SCell 130-2 to maximize downlink throughput. The activation is done via media access control (MAC) control element (CE). After receiving the MAC CE activating the SCell 130-2, the UE 110 can maintain a timer (sCellDeactivationTimer) for the SCell 130-2 and deactivate the SCell 130-2 upon its expiry. Upon the SCell 130-2 activation, the UE 110 can transmit a sounding reference signal (SRS) on the SCell 130-2, report channel state information (CSI) for the SCell 130-2 (e.g., channel quality indicator (CQI), preceding matrix indicator (PMI), rank indication (RI) and precoding type indicator (PTI)), monitor physical downlink control channel (PDCCH) on the SCell 130-2, and monitor PDCCH for the SCell 130-2 (e.g., cross-carrier scheduling).

The BS 120 can also deactivate the activated SCell 130-2 when there is no more data to be delivered to the UE 110 or the channel quality of the SCell 130-2 turns deteriorated, to reduce the power consumption of the UE 110. The UE 110 can deactivate the SCell 130-2 based on sCellDeactivation-Timer, which is the amount of time the UE 110 has not received any data on the SCell 130-2. For example, sCell-DeactivationTimer can take values starting from 20 ms to 1280 ms. As sCellDeactivationTimer expires, the UE 110 deactivates the SCell 130-2. The BS 120 can also send to the UE 110 a deactivation MAC CE indicating at least one of the configured SCells 130-2 and 130-3 to be deactivated. For example, the deactivation MAC CE can be identified by a MAC protocol data unit (PDU) subheader with a unique logical channel ID (LCD): 11011, have a fixed size, and consist of a single octet containing one R-field (i.e., a reserved bit set to "0") and seven C-fields each representing an SCell with SCellIndex i ranging from 1-7. For example, the C-field can be set to "1" to indicate that the SCell with SCellIndex i shall be activated, or can be set to "0" to indicate that the SCell with SCellIndex i shall be deactivated. After receiving the MAC CE deactivating the SCell 130-2, the UE 110 can deactivate the SCell 130-2, and, upon the SCell 130-2 deactivation, stop transmitting the SRS on the SCell 130-2, reporting the CSI for the SCell 130-2, monitoring PDCCH on the SCell 130-2, and monitoring PDCCH for the SCell 130-2.

The BS 120 can send the activation MAC CE to the UE 110 again to reactivate the re-deactivated SCell 130-2, and the UE 110 can then transmit the SRS on the SCell 130-2, report the CSI for the SCell 130-2, monitor PDCCH on the SCell 130-2, and monitor PDCCH for the SCell 130-2.

The SCell activation time (or the SCell activation latency) is defined as the time required for an SCell activation procedure after the UE 110 receives the activation MAC CE. The SCell activation procedure can include radio frequency (RF) power on, frequency tuning, automatic gain control (AGC), RF and frequency correction, SCell timing synchronization, and master information block (MIB) reading (for unknown SCell). For example, the main latency contributors may be AGC (which needs at least 1 or 2 synchronization signal blocks (SSBs)), frequency tracking loop (FTL)/time tracking loop (TTL) and MIB reading. Under a typical SS/PBCH block measurement time configuration (SMTC) (e.g., 20 ms), NR SCell activation latency is even longer than LTE, as the SSBs are much sparser in NR than cell specific reference signals (CRSs) in LTE. In NR, the SCell activation procedure can further include beam management (for frequency range 2 (FR2)), and thus the SCell activation latency is further increased.

Figure 3:
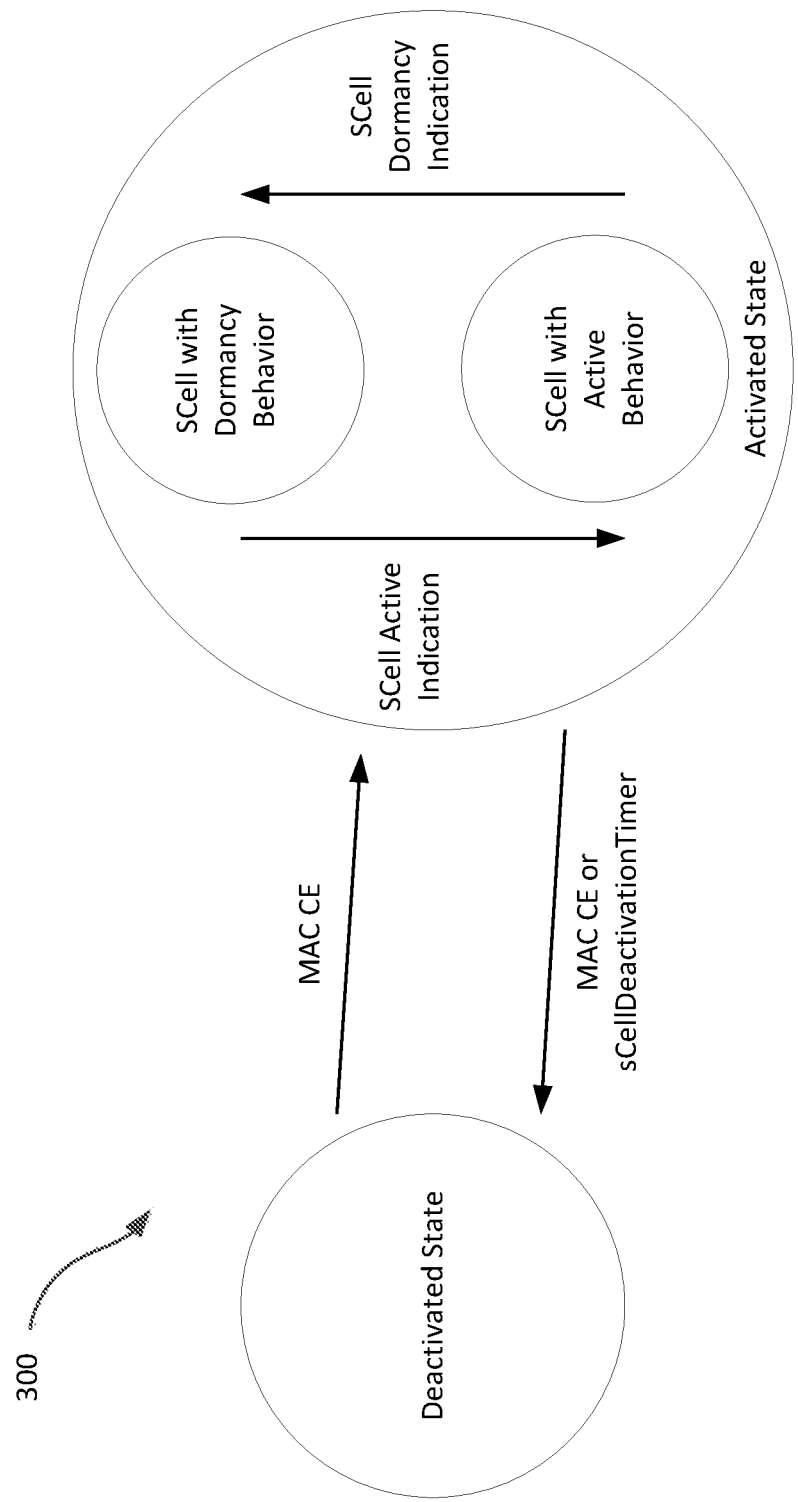
FIG. 3 shows an exemplary transitioning of an activated SCell between an active behavior and a dormancy behavior according to some embodiments of the disclosure.

FIG. 3 shows an exemplary transitioning of an activated SCell between an active behavior and a dormancy behavior according to some embodiments of the disclosure. For example, the activated SCell 130-2 can be transitioned from the dormancy behavior to the active behavior when the PCell 130-1 has data scheduling activity or is switched to a large data bandwidth part (BWP). When the SCell 130-2 is activated with the active behavior, the UE 110 can transmit the SRS on the SCell 130-2, report CSI for the SCell 130-2, monitor PDCCH on the SCell 130-2, and monitor PDCCH for the SCell 130-2. When the SCell 130-2 is transitioned from the active behavior to the dormancy behavior, the UE 110 can still transmit the SRS on the SCell 130-2 and report CSI for the SCell 130-2, but stop monitoring PDCCH on the SCell 130-2 and monitoring PDCCH for the SCell 130-2, to reduce power consumption. The SCell activation latency required for the SCell activation procedure can depend on the readiness of the SCell. For example, if the SCell to be configured has been measured by the UE 110 or the UE 110 has valid prior knowledge on synchronization and AGC of the SCell, the SCell activation latency can be reduced. Therefore, the latency required to transition an activated SCell from the dormancy behavior to the active behavior is far shorter than the SCell activation latency required to transition an SCell from a deactivated state to an activated state, as the UE 110 already knows the synchronization and AGC of the activated SCell.

In NR, up to 16 DL CCs can be configured for the UE 110. Considering DCI size alignment, more than 15 bits (e.g., a bitmap of a length=15 bits) are required to configure as many as 15 SCells associated with the 15 CCs. For example, in downlink control information (DCI) without data scheduling the following fields of a transport block 1 (TB1) can be repurposed for dormancy indication: modulation coding scheme (MCS) (5 bits), new data indicator (NDI) (1 bits), redundancy version (RV) (2 bits), hybrid automatic repeat request (HARD) process number (4 bits), antenna ports (>4 bits) and demodulation reference signal (DMRS) sequence initialization (1 bits).

Figure 4:
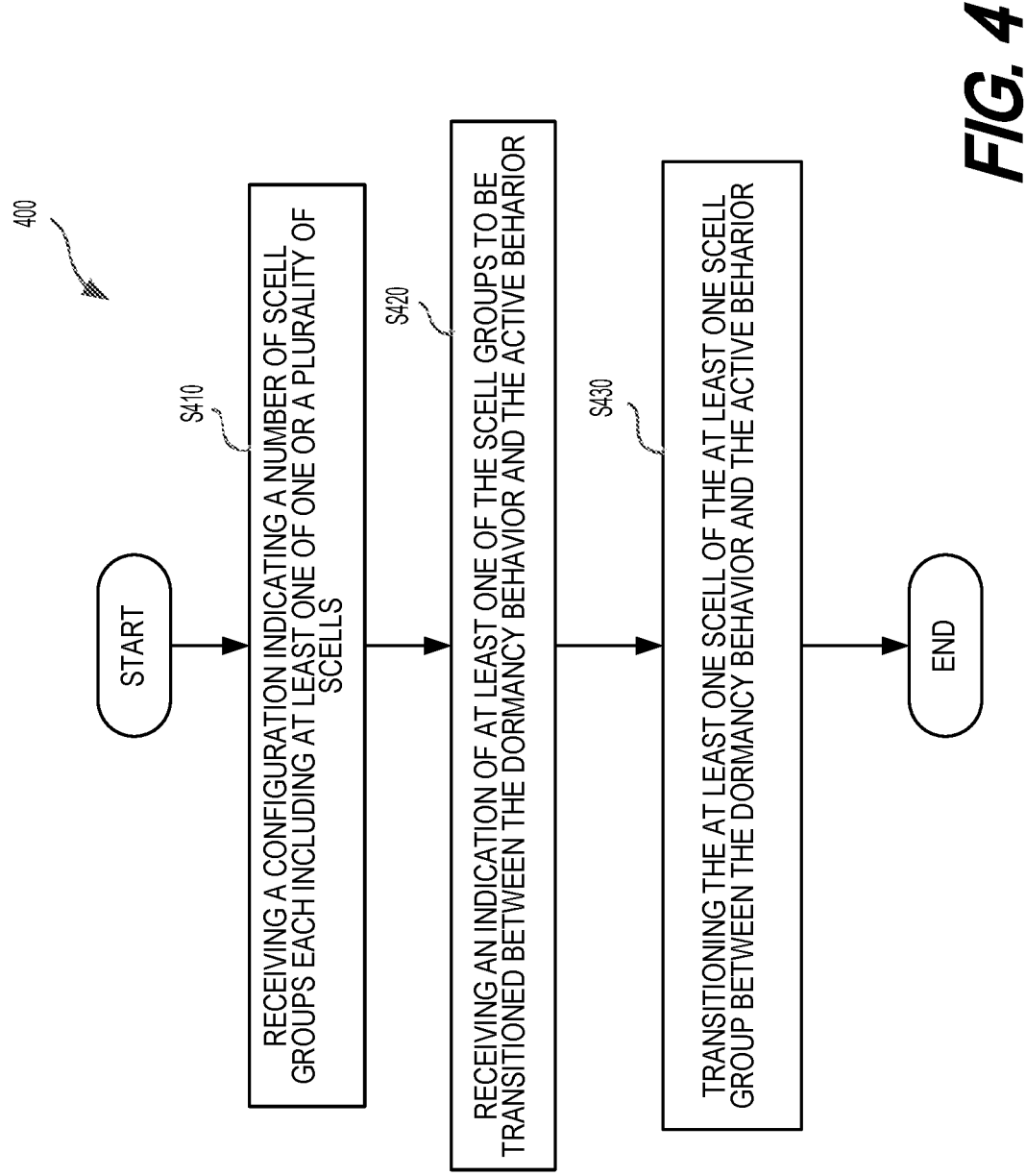
FIG. 4 shows a flow chart of an exemplary method for transitioning one or a plurality of activated SCells between an active behavior and a dormancy behavior according to some embodiments of the disclosure.

FIG. 4 shows a flow chart of an exemplary method 400 for transitioning one or a plurality of activated SCells between an active behavior and a dormancy behavior according to some embodiments of the disclosure. The method 400 can groupwise transition the activated SCells between the active behavior and the dormancy behavior, to reduce the signaling overhead of transitioning the active SCells. In various embodiments, some of the steps of the method 400 shown can be performed concurrently or in a different order than shown, can be substituted by other method steps, or can be omitted. Additional method steps can also be performed as desired. Aspects of the method 400 can be implemented by a wireless device, such as the UE 110 illustrated in and described with respect to the preceding figures.

At step 410, the UE 110 can receive from the BS 120 a configuration indicating a number of SCell groups each including at least one of the SCells. In some embodiments, the number can be between 1 and 5. For example, 6 SCells with SCellIndexes #1-#6, respectively, can be configured to the UE 110; the 6 SCells with SCellIndexes #1-#6 can be configured into three SCell groups #0-#2 (e.g., Dormancy- GroupID-r16=0, 1, 2), wherein SCell group #0 can have the SCell with SCellIndex #1, SCell group #1 can have the SCells with SCellIndexes #2 and #3, and SCell group #2 can have the SCells with SCellIndexes #4-#6; and the UE 110 can receive the configuration from the BS 120. In some embodiments, the configuration can be included in an RRC message. In various embodiments, the SCells can be indexed according to sizes of their respective SCell identities (SCell IDs), and the configuration can further indicate an index of the at least one SCell included in each of the SCell groups. For example, the 6 SCells with SCellIndexes #1 and #6 can have their SCell IDs that are ordered from least to greatest.

At step 420, the UE 110 can receive an indication of at least one of the SCell groups to be transitioned between the dormancy behavior and the active behavior. In some embodiments, the indication can be signaled by downlink control information (DCI). In other embodiments, the DCI can include a DCI format and a bitmap that can be appended to the DCI format and have the number of bits each corresponding to one of the SCell groups to be transitioned between the dormancy behavior and the active behavior. In various embodiments, the DCI format can be DCI format 0-1 or DCI format 1-1. For example, the UE 110 can receive from the BS 120 a 3-bit bitmap indication ("010") that is appended to DCI format 0-1 or DCI format 1-1 to indicate transition between the dormancy behavior and the active behavior for the three SCell groups #0-#2.

At step 430, the UE 110 can transition the at least one SCell of the at least one SCell group between the dormancy behavior and the active behavior. For example, the UE 110 can transition the SCells with SCellIndexes #2 and #3 of SCell group #1 to the active behavior and transition the SCell with SCellIndexes #1 of SCell group #0 and the SCells with SCellIndexes #4-#6 of SCell group #2 to the dormancy behavior.

In some embodiments, the method 400 can further include transmitting a characteristic of the SCells to the BS 120. For example, one of SCell groups #0-#2 (e.g., SCell group #1) can include at least two SCells (e.g., the SCells with SCellIndexes #2 and #3), and the characteristic can indicate that the at least two SCells (i.e., the SCells with SCellIndexes #2 and #3) use a common radio frequency (RF) front end. Therefore, the BS 120 can configure the activated SCells into groups based on the characteristic of the SCells transmitted by the UE 110. In other embodiments, one of the SCell groups can include at least two SCells that share a common frequency band. For example, one of the SCell groups #0-#2 (e.g., SCell group #1) can include at least two SCells (e.g., the SCells with SCellIndexes #2 and #3) that share a common frequency band. Therefore, the BS 120 can configure the activated SCells into groups based on its own knowledge.

Figure 5:
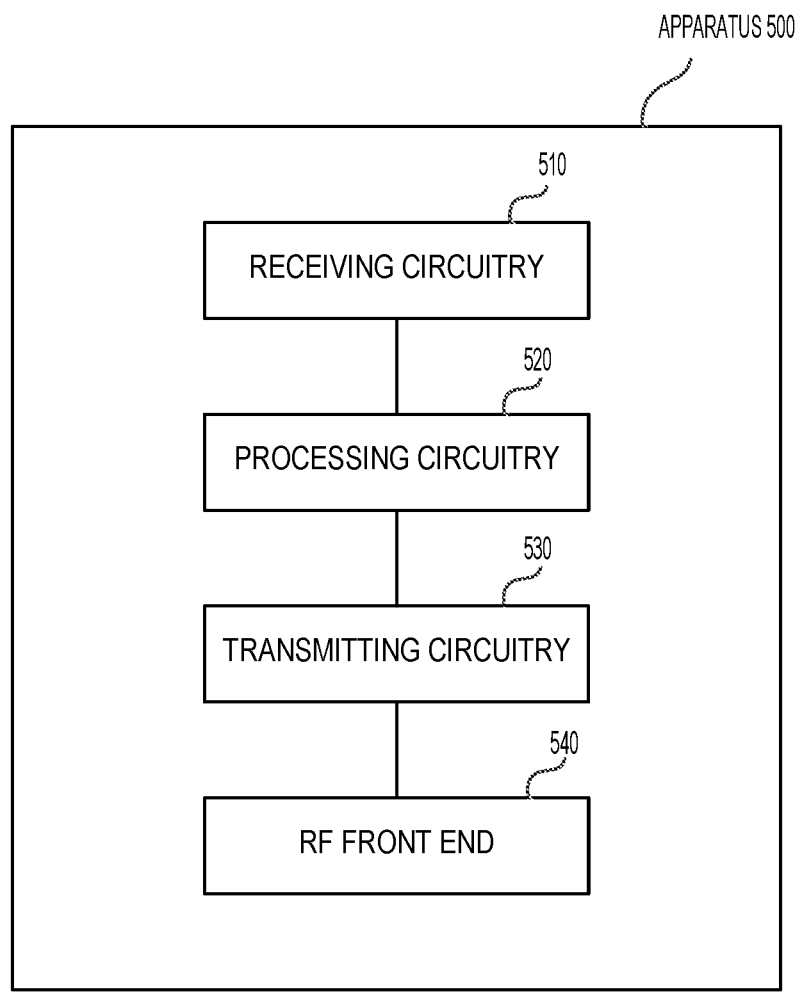
FIG. 5 shows a functional block diagram of an exemplary apparatus for transitioning one or a plurality of activated SCells between an active behavior and a dormancy behavior according to some embodiments of the disclosure.

FIG. 5 shows a functional block diagram of an exemplary apparatus 500 according to some embodiments of the disclosure. The apparatus 500 can be configured to perform various functions in accordance with one or more embodiments or examples described herein. Thus, the apparatus 500 can provide means for implementation of mechanisms, techniques, processes, functions, components or systems described herein. For example, the apparatus 500 can be used to implement functions of UEs in various embodiments and examples described herein. The apparatus 500 can include a general purpose processor or specifically designed circuits to implement various functions, components or processes described herein in various embodiments. In some embodiments, the apparatus 500 can include receiving circuitry 510, processing circuitry 520, transmitting circuitry 530 and an RF front end 540.

In some embodiments, the receiving circuitry 510 can be configured to receive a configuration indicating a number of SCell groups each including at least one of the SCells. For example, the number can be between 1 and 5. In other embodiments, the configuration can be included in an RRC message. In various embodiments, the SCells can be indexed according to sizes of their respective SCell identities (SCell IDs), and the configuration can further indicate an index of the at least one SCell included in each of the SCell groups.

In some embodiments, the receiving circuitry 510 can be further configured to receive an indication of at least one of the SCell groups to be transitioned between the dormancy behavior and the active behavior. In other embodiments, the indication can be signaled by DCI. In various embodiments, the DCI can include a DCI format and a bitmap that can be appended to the DCI format and have the number of bits each corresponding to one of the SCell groups to be transitioned between the dormancy behavior and the active behavior. In another embodiment, the DCI format can be DCI format 0-1 or DCI format 1-1.

In some embodiments, the processing circuitry 520 can be configured to transition the at least one SCell of the at least one SCell group between the dormancy behavior and the active behavior. In other embodiments, the transmitting circuitry 530 can be configured to transmit a characteristic of the SCells. For example, one of the SCell groups can include at least two SCells, and the characteristic can indicate that the at least two SCells each use the RF front end 540. For example, one of the SCell groups includes at least two SCells that share a common frequency band. In various embodiments, the SCells are indexed according to sizes of their respective SCell IDs, and the configuration further indicates an index of the at least one SCell included in each of the SCell groups.

In various embodiments according to the disclosure, the receiving circuitry 510, the processing circuitry 520, the transmitting circuitry 530 and the RF front end 540 can include circuitry configured to perform the functions and processes described herein in combination with software or without software. In some embodiments, the transmitting circuitry 530 can be integrated with the RF front end 540. In various examples, the processing circuitry 520 can be a digital signal processor (DSP), an application specific integrated circuit (ASIC), programmable logic devices (PLDs), field programmable gate arrays (FPGAs), digitally enhanced circuits, or comparable device or a combination thereof. In some other embodiments according to the disclosure, the processing circuitry 520 can be a central processing unit (CPU) configured to execute program instructions to perform various functions and processes described herein.

The apparatus 500 can optionally include other components, such as input and output devices, additional or signal processing circuitry, and the like. Accordingly, the apparatus 1000 may be capable of performing other additional functions, such as executing application programs, and processing alternative communication protocols.

The processes and functions described herein can be implemented as a computer program which, when executed by one or more processors, can cause the one or more processors to perform the respective processes and functions. The computer program may be stored or distributed on a suitable medium, such as an optical storage medium or a solid-state medium supplied together with, or as part of, other hardware. The computer program may also be distributed in other forms, such as via the Internet or other wired or wireless telecommunication systems. For example, the computer program can be obtained and loaded into an apparatus, including obtaining the computer program through physical medium or distributed system, including, for example, from a server connected to the Internet.

The computer program may be accessible from a computer-readable medium providing program instructions for use by or in connection with a computer or any instruction execution system. The computer readable medium may include any apparatus that stores, communicates, propagates, or transports the computer program for use by or in connection with an instruction execution system, apparatus, or device. The computer-readable medium can be magnetic, optical, electronic, electromagnetic, infrared, or semiconductor system (or apparatus or device) or a propagation medium. The computer-readable medium may include a computer-readable non-transitory storage medium such as a semiconductor or solid state memory, magnetic tape, a removable computer diskette, a random access memory (RAM), a read-only memory (ROM), a magnetic disk and an optical disk, and the like. The computer-readable non-transitory storage medium can include all types of computer readable medium, including magnetic storage medium, optical storage medium, flash medium, and solid state storage medium.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method for transitioning one or a plurality of activated secondary cells (SCells) between a dormancy behavior and an active behavior, comprising:
   receiving, at a user equipment (UE), from a base station (BS) a configuration indicating a number of SCell groups each including at least one of the SCells;
   receiving an indication of at least one of the SCell groups to be transitioned between the dormancy behavior and the active behavior, wherein the indication is signaled by downlink control information (DCI);
   transitioning the at least one SCell of the at least one SCell group between the dormancy behavior and the active behavior; and
   transmitting a characteristic of the SCells to the BS,
   wherein one of the SCell groups includes at least two SCells, and the characteristic indicates that the at least two SCells use a common radio frequency (RF) front end.

2. The method of claim 1, the DCI includes a DCI format and a bitmap that is appended to the DCI format and has the number of bits each corresponding to one of the SCell groups to be transitioned between the dormancy behavior and the active behavior.

3. The method of claim 2, the DCI format is DCI format 0-1 or DCI format 1-1.

4. The method of claim 1, wherein the configuration is included in a radio resource control (RRC) message.

5. The method of claim 1, wherein one of the SCell groups includes at least two SCells that share a common frequency band.

6. The method of claim 1, wherein the number is between 1 and 5.

7. The method of claim 1, wherein the SCells are indexed according to sizes of their respective SCell identities (SCell IDs), and the configuration further indicates an index of the at least one SCell included in each of the SCell groups.

8. An apparatus for transitioning one or a plurality of activated SCells between a dormancy behavior and an active behavior, comprising:
   receiving circuitry configured to receive a configuration indicating a number of SCell groups each including at least one of the SCells, and an indication of at least one of the SCell groups to be transitioned between the dormancy behavior and the active behavior, wherein the indication is signaled by downlink control information (DCI);
   processing circuitry configured to transition the at least one SCell of the at least one SCell group between the dormancy behavior and the active behavior;
   transmitting circuitry configured to transmit a characteristic of the SCells; and
   an RF front end,
   wherein one of the SCell groups includes at least two SCells, and the characteristic indicates that the at least two SCells each use the RF front end.

9. The apparatus of claim 8, the DCI includes a DCI format and a bitmap that is appended to the DCI format and has the number of bits each corresponding to one of the SCell groups to be transitioned between the dormancy behavior and the active behavior.

10. The apparatus of claim 9, the DCI format is DCI format 0-1 or DCI format 1-1.

11. The apparatus of claim 8, wherein the configuration is included in an RRC message.

12. The apparatus of claim 8, wherein one of the SCell groups includes at least two SCells that share a common frequency band.

13. The apparatus of claim 8, wherein the number is between 1 and 5.

14. The apparatus of claim 8, wherein the SCells are indexed according to sizes of their respective SCell IDs, and the configuration further indicates an index of the at least one SCell included in each of the SCell groups.

* * * * *